United States Patent [19]

Thompson

[11] Patent Number: 4,948,364
[45] Date of Patent: Aug. 14, 1990

[54] LIME KILNS

[76] Inventor: Jeffery L. Thompson, 3059 Old Stone Dr., Birmingham, Ala. 35243

[21] Appl. No.: 243,136

[22] Filed: Sep. 9, 1988

Related U.S. Application Data

[63] Continuation of Ser. No. 873,170, Jun. 10, 1986, abandoned.

[51] Int. Cl.$^5$ ............................................. F28D 15/00
[52] U.S. Cl. ...................................... 432/98; 432/99; 432/101
[58] Field of Search ................................. 432/95–101, 432/102

[56] References Cited

U.S. PATENT DOCUMENTS

| | | | |
|---|---|---|---|
| 2,996,292 | 8/1961 | Gray et al. | 432/99 |
| 3,003,756 | 10/1961 | Steffensen | 432/99 |
| 3,253,823 | 5/1966 | Junker et al. | 432/95 |
| 3,351,685 | 11/1967 | Schmidt et al. | |
| 3,379,425 | 4/1968 | Dell'Agnese et al. | 432/101 |
| 3,832,128 | 8/1974 | Paul | 432/98 |
| 3,889,393 | 6/1975 | Thomas et al. | |
| 3,957,422 | 5/1976 | Kohn | |
| 4,120,644 | 10/1978 | Namasaki et al. | 432/99 |
| 4,193,760 | 3/1980 | Vawter et al. | 432/98 |
| 4,254,221 | 3/1981 | Beckenbach | |
| 4,389,979 | 6/1983 | Saxlund | 432/99 |
| 4,431,407 | 2/1984 | Beckenbach et al. | 432/99 |
| 4,473,352 | 9/1984 | Sonoda et al. | |

OTHER PUBLICATIONS

Von D. Lewerenz article from Zement—Kalk—Gips magazine; Sep., 1987.
Advertisment for KOSIK; Aug. 1987 in Zement—Kalk—Gips magazine.

Primary Examiner—Henry C. Yuen
Attorney, Agent, or Firm—Limbach, Limbach & Sutton

[57] ABSTRACT

An annular, vertical shaft kiln comprising a cascading process path with varying cross sectional area, in which the coarse charge particulants tend to follow the longer path near the walls as does the gas being injected into the mid-region of the kiln, while the fine particulants tend to take the straighter, shorter path near the middle, thus resulting in an even calcination of varying diameters of charge particulants. The briquetted fuel which may be made of hazardous waste, is heated slowly to safely destroy such wastes in the processing. Because of the limited range of the ratio of the smallest to the largest diameter of the charge particulants, the charge particulants are sorted through wire mesh screens into bins according to diameter. The kiln's computer then receives data on the process at various points along the path and controls the process by regulating the charge particulants injection, the rate of the fuel injection and/or the speed of the air injection.

4 Claims, 3 Drawing Sheets

LIME KILNS

This is a continuation of application Ser. No. 873,170, filed June 10, 1986, which was abandoned upon the filing hereof.

BACKGROUND OF THE INVENTION

The present invention relates generally to a method and apparatus for the thermal treatment of particulate materials with the gaseous or gassifiable fuels in air in which various combinations of the following methods and apparatus are employed: a partially or wholly briquetted fuel; a partially or wholly briquetted charge; a cascading process path; a path with a varying process cross section; an annular process path; computer control of the rate of the input of the charge, the fuel and injected air; and/or charge sorted in order to limit the range of the size of the particles of the charge.

Three major areas in the lime production industry present challenges and opportunities for improvement: production costs and efficiency; production quality, especially as it relates to the steel industry; and hazardous waste disposal. Lime production involves the process of calcination: lime is derived from limestone by heating the limestone above the equilibrium temperature of calcium carbonate so that it dissociates into calcium oxide (lime) and carbon dioxide.

$$CaCO_3 \rightarrow CaO + CO_2$$

This process of calcination refers to a class of reactions which involves heating a substance until a weight gain or loss reaction occurs without melting the original substance. The calcination of limestone is the representative of the weight loss category. The heat energy required for this reaction is supplied by fuel combustion, usually coal; but oil, natural gas and other fuels such as wood and old tires are also used.

Substantial energy is required for calcination. The theoretical heat of reaction at 900° C. (1652° F.) is more than 720 Kcal per Kg of CaO produced. Therefore 2,400,000 BTU's or roughly 400 pounds of coal are required to calcinate a ton of lime.

In a counter-flow, shaft or vertical type of kiln, the limestone is introduced at the top of the kiln and makes its way slowly down through the device, finally being discharged at the bottom as lime. Air is introduced at the bottom of the shaft and is drawn upward, counterflow to the descending limestone/lime particles. As the air moves upward from the bottom of the shaft it is warmed by extracting heat from the lime which is about to exit the kiln. Thus in the lower portion of the kiln the lime is tranfering heat to the air, the heat transfer is from the solids to the gas. At the point, part way up in the shaft, where fuel is introduced into the system the heat transfer is reversed. Due to the energy release of the burning fuel the air becomes hotter than the limestone/lime particles and heat transfer then takes place from the kiln gases to the solids. Thus in the mid to upper region of the shaft the heat transfer is from the gas to the solids.

In recent times the mixed feed kiln has been restricted to using coke and/or petroleum coke with little or no volatile fraction. The shaft kiln of modern times (the last century) has used a liquid or gaseous fuel introduced at a mid-point so as to utilize the volatile fraction of the fuel. This results in gas temperatures where the fuel is introduced into the kiln which are on the order of 2800 to 3000 F.

At the on-set of calcination the reaction rate is at its maximum, thus the heat flux density in the kiln should be also, but the temperatures required for calcination (even at a relatively high rate) never exceed 2000 to 2200 F. It is necessary, however, to raise the temperature of the limestone from ambient when it is introduced, to calcination level (about 1652° F. or so).

Fuel has jumped from less than 10% of the cost of producing lime in the early 1970's to more than a third, with most modern lime producers using coal as a fuel. However, the conditions necessary for complete combustion of fossil fuels are less than ideal for the calcination of limestone. The adiabatic flame temperature of coal with stoichiometric air is in the range of 1650° C. (3000° F.), whereas the calcination of limestone in an atmosphere of 25 to 35% $CO_2$ (flue gas composition) only requires 950° C. (about 1750° F.). The actual heat used by most commercial kilns is 1.5 to 5 times the theoretical requirement. The excessively high temperatures waste heat, place an undue burden on the kiln design and refractory selection of having to insulate the combustion region against temperatures nearly 1,000° F. higher than necessary. The high temperatures in ordinary kilns also tend to minimize the specific surface area of the lime that is produced; higher specific surface areas promote the rate at which lime reacts with water as well as other substances and is becoming an increasingly more important property of lime.

Utilization of the quarried or mined limestone as a feed-stock to the kilns is an important criteria in the overall cost structure of a lime plant. The quarrying and mining operations yield limestone that ranges in size from boulders weighing several tons to dust-sized particles. The lime kilns, however, cannot tolerate such a wide size range, thus it is necessary to crush and screen the limestone to some narrower size range before it can be introduced into a lime kiln. There are limits to both the largest and smallest pieces that can effectively be used in a kiln, while the over-size pieces can be crushed down to fit into the desired size range the under-size (called fines) material becomes a by-product. Although there is a limited market for the fines the value added is trivial or non-existent compared to being able to use the limestone as a feed-stock to a kiln. Consequently, the producer is driven to use as wide a size range as possible in an effort to maximize the utilization of the quarried limestone. Smooth, efficient operation of a lime kiln, however, requires as narrow a size range as possible. The ideal kiln feed-stock would be uniform spheres. These two competing criteria for sizing the limestone to be used as a kiln feed result in a compromise that is never wholly satisfactory to either demand.

Normal run-of-quarry (or mine) limestone is sent to a secondary crushing and screening operation where the material is reduced to kiln-feed size and the undersize limestone is set aside. Because the kiln-feed is then delivered to the kiln as a lump aggregate of many sized pieces there are sharp limits to the range of size that any given kiln can process. Usually acceptable practice in the industry limits the size range to about a 2:1 ratio, the largest stone is only twice the size of the smallest. Most lime plants actually operate with a size range closer to 3:1, particularly if they have but one or two kilns, in an effort to keep the quarry yield within economic bounds. A typical secondary crushing and screening unit recycles the over-size stone, rejects the undersize and sends the kiln-feed size range to a stockpile. As the kiln-feed size range is constricted the portion of the quarry output that is lost as fines or undersized limestone increases dramatically. However, the new fuel efficient shaft kilns and rotary kilns with pre-heaters cannot accept a wide size range of feed nor a feed with a very small bottom size in the feed.

This results in a considerable loss of quarry production as undersize material; the overall quarry to product yield in a plant with only one kiln or single feed size is rarely a great deal better than 3:1 and may be as poor as 6:1.

The product, lime in the form of pebbles, has two important deficiencies when used in the production of steel. First, it is soft and readily breaks down in the material handling equipment used to move and store it; and second, when introduced into the steel hot metal bath, a coating of calcium silicate compounds forms around the pebble which extends the time necessary to process a given batch of hot metal. Modern steel making operations typically use two types of lime: high calcium lime which is more than 90% CaO; and dololime, from calcining dolomite, a sedimentary rock comprised of an equal molar ratio of calcium and magnesium carbonates. A mix of oxides balances with the chemistry of the refractories in the steel making vessel and extends the useful life of the refractory lining.

Competition in the steel industry has led to increased efforts in the direction of quality control, and economy of operations. The breakage of lime in handling and transport results in a product that is not uniform in size, nor is the size distribution predictable. When lime is added to steel making vessels the fine fraction of the lime is carried away into the dust collection system of the steel plant. The amount of lime actually added to the hot metal is thus a combination of the amount of the lime charged and the size distribution of the lime. While control of the size distribution is not practical, the steel producers have specified that the lime will have a certain minimum size thus eliminating, or at least minimizing, the fines in the lime charge. This makes the amount of lime charged to the hot metal bath more consistent and thus more predictable.

The use of two types of lime, high calcium and dololime, simply doubles the number of problems associated with the feed and control of additives to the steel making process.

The demands of the steel producer for lime of a known and consistent size distribution, free of fines, creates significant problems for the lime manufacturer. A typical lime manufacturing plant quarries or mines about 3 tons of limestone for each ton of lime that is produced. Very small pieces of limestone, that which would pass a 4 Mesh screen, are not readily utilized in modern calcining kilns. The fine limestone is usually sold in the crushed stone or gravel market. Additional breakage occurs during manufacturing and product handling as the lime is being loaded for transport. Fine lime, passing a 6 or 8 Mesh screen, becomes something of a marginal product. Problems of dust, housekeeping, and handling a fine material makes the lime fines less desireable even though the end use may be to dissolve the lime into a slag bath. The overall effect is to increase the material cost of making lime, and make it more difficult to improve the efficiencies of lime manufacturing.

A number of lime producers have and do make a product in which an iron source such as mill scale, is combined with limestone and the two are processed together. This results in a lime/calcium ferrite material of variable composition, and one which poses considerable processing problems. Lime is readily fluxed by iron to yield low melting eutectic compositions. In kilns where the product is exposed to a flame there is the potential to slag or fuse the product to the refractory walls of the kiln. The variable composition is a result of the limestone of different sizes contacting different amounts of iron as it passes through the kiln. Small pieces of limestone have a proportionately higher surface area than large pieces and therefore have a greater contact with the iron, resulting in an iron richer composition than larger pieces.

Amendments in 1984 to the Resource Conservation & Recovery Act (RCRA) will make it necessary to treat all hazardous wastes by 1990. It will no longer be possible to dispose of unstabilized, hazardous liquid wastes. Permitted landfill sites are becoming more restrictive as EPA moves to close unregulated dumps (about 500 landfill sites per year are being shut down by EPA). Incineration is considered to be an acceptable disposal technique, but costly in its present method of operation.

Most existing incinerators have a support flame to ensure that the combustor is sufficiently hot to effectively destruct the hazardous waste irrespective of its calorific content. Existing incinerators also either waste the heat that is produced by the combustion process or recover some of it as steam. The newest designs recover the heat as steam for power (electric) generation.

SUMMARY OF THE INVENTION

The present invention has elements in the overall concept of a vertical or shaft kiln which can efficiently utilize fuels having significant volatile content. This involves the design of the kiln itself, its feed and control systems, its thermal efficiency, as well as the design of the fuel and charge materials and how they are introduced into the kiln.

The natural cascading path of the larger particles is longer than the path of the smaller particles within any given charge of limestone. There is then a differential in the transport rate the larger particles spending slightly more time being processed than the smaller particles.

Because of the reversal of the position of the larger and smaller particles from inside to outside diameters it is necessary for the gas to pass through the region of smaller particles in order to reach the low resistance path of the larger particles. This ensures that the kiln gases will have passed evenly dispersed through the regions of smaller particles as well as those of the larger particles.

There is a free surface of limestone/lime at an intermediate point in the kiln, roughly midway in the vertical direction. This allows solid fuel to be introduced in lump form and evenly distributed over the surface of the limestone/lime charge. The intermediate fuel entry location also makes it possible to ensure that the volatile fraction of the fuel is combusted, and that the full heating value of the fuel is realized in the calcination process.

The cross-sectional area of the process path varies such that the relative gas to solids velocity is almost a constant over most of the process.

According to another feature of the invention, rather than a single size range of limestone being used as the kiln feed-stock the invention uses a series of bins and a computer controller so that several narrow size ranges of limestone can be utilized.

For any given size limestone being fed to the kiln there is an optimum amount and size of briquette which will simultaneously provide the maximum possible lime production rate using the least possible amount of fuel.

The solution involves the simultaneous solution of equations for the heat transfer to the limestone for calcination, the temperature profile to be created by the heat flux density that is a consequence of the fuel briquette density, temperature at injection and gas flow rate. Because the solution require numerous iterations of the equations to arrive at an optimal fuel size and amount, and the solutions must be odne in real time as the kiln is in operation the only controller capable of such a prodigous mathematical burden is a computer.

By controlling the fuel density in the kiln, the temperature profile as well as heat flux density are controlled and combustion of the fuel briquette occurs as a glowing ember rather than as a flaming lump.

The invention has a significant advantage in that the hot filter bed of lime/limestone provides thermal inertia and an ignition source for the hydrocarbons as they are volatilized and given off. The heat recovery is in the lime that is produced for commercial sale, a dual revenue source.

According to another feature of the invention, the fuel briquettes are themselves an important chemical process and set of reactions. Being able to incorporate waste materials, hazardous or not, that have some calorific value is an important feature.

A very wide spectrum of materials can be considered as potential fuels. The list of materials that can be made into a briquette which is in turn acceptable includes but is not limited to: coal, coal fines refuse from coal washing plants, petroleum coke, coke breeze from blast furnaces, numerous waste streams, and many paint and solvent waste liquids. A lime kiln can be designed which is both efficient and can accept a variety of hazardous materials as partial or total fuel supply. The use of the briquettes in which combustion takes place as a glowing coal rather than a flame allows the process heat release rate to be distributed in the same manner as the calcination conversion occurs.

According to another feature of the invention, an adjunct of the fuel design is that low grade, that is low BTU content materials may be used as fuels. Hazardous materials may be used as fuels, and in the course of being used as a fuel the hazardous materials are effectively destroyed.

A pressed briquette comprised of the proper size distribution of materials, and simultaneously having teh desired chemical composition, results in a product that satisfies the steel producer and is readily manufactured in a lime plant. These briquettes have crushing strengths in the range of 1,000 psi (unconfined compression test).

It will thus be seen that the present invention does indeed provide an improved apparatus, system and process for calcination and which is superior in operability, realiability, economy and efficiency.

BRIEF DESCRIPTION OF THE DRAWINGS

Other objects, features and advantages of the invention, its organization, construction and mode of operation will be better understood from the following detailed description; taken in conjunction with accompanying drawings, on which.

DETAILED DESCRIPTION OF PREFERRED EMBODIMENTS

Figure 1:
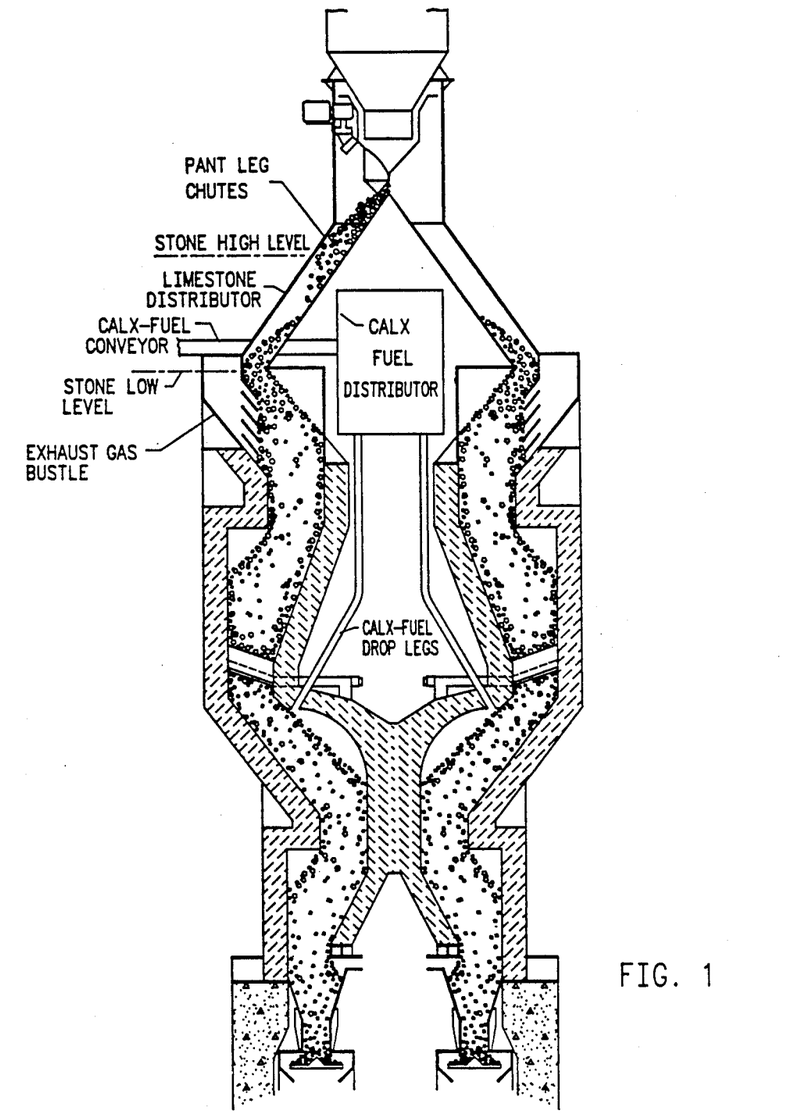
FIG. 1 shows a cross sectional view of an annular, vertical shaft kiln having a cascading process path, according to the invention.

FIG. 1 depicts a cross section of a typical annular, vertical shaft kiln having a cascading process path where the cross sectional area of the process path varies as a function of the vertical station of the kiln. Both the cascading effect and the variation in cross sectional area is achieved by varying the diameter of the outside wall of the path as a function of vertical station and an independent variation of the diameter of the inside wall of the process path as a function of vertical station. The charge is conveyed into the octagon hub and then diverted into the pant leg chutes. It then falls past the exhaust gas bustle as it enters the cascading path. The process path is shaped in the manner to provide a free surface of charge on which to input the fuel in the mid region of the kiln. The non-gaseous fuel and charge continue down the cascading path past the coolant air injection port to the lime charge discharge end of the process path. Simultaneous to this activity, air is injected into the cooling air injection port. It travels in the reverse direction through the kiln against the flow of the charge. As it nears the fuel injection level, a portion of the gas is diverted into the port which carries that portion of the gas flow to a hood bridge just above the fuel injection level where that portion reenters the main flow of gas in the kiln. This combined flow of gas continues upward in the kiln until it reaches the exhaust gas bustle where it exits the kiln. Appropriate fuel is fed into a fuel distributor where it passes into the individual drop legs through which it is delivered into the process path at the fuel injection level.

Mixing the fuel with the limestone at the top of the shaft results in wasting the volatile fraction of the fuel: the volatiles are driven off at a temperature too low and in concentrations too low to be ignited.

Figure 2:
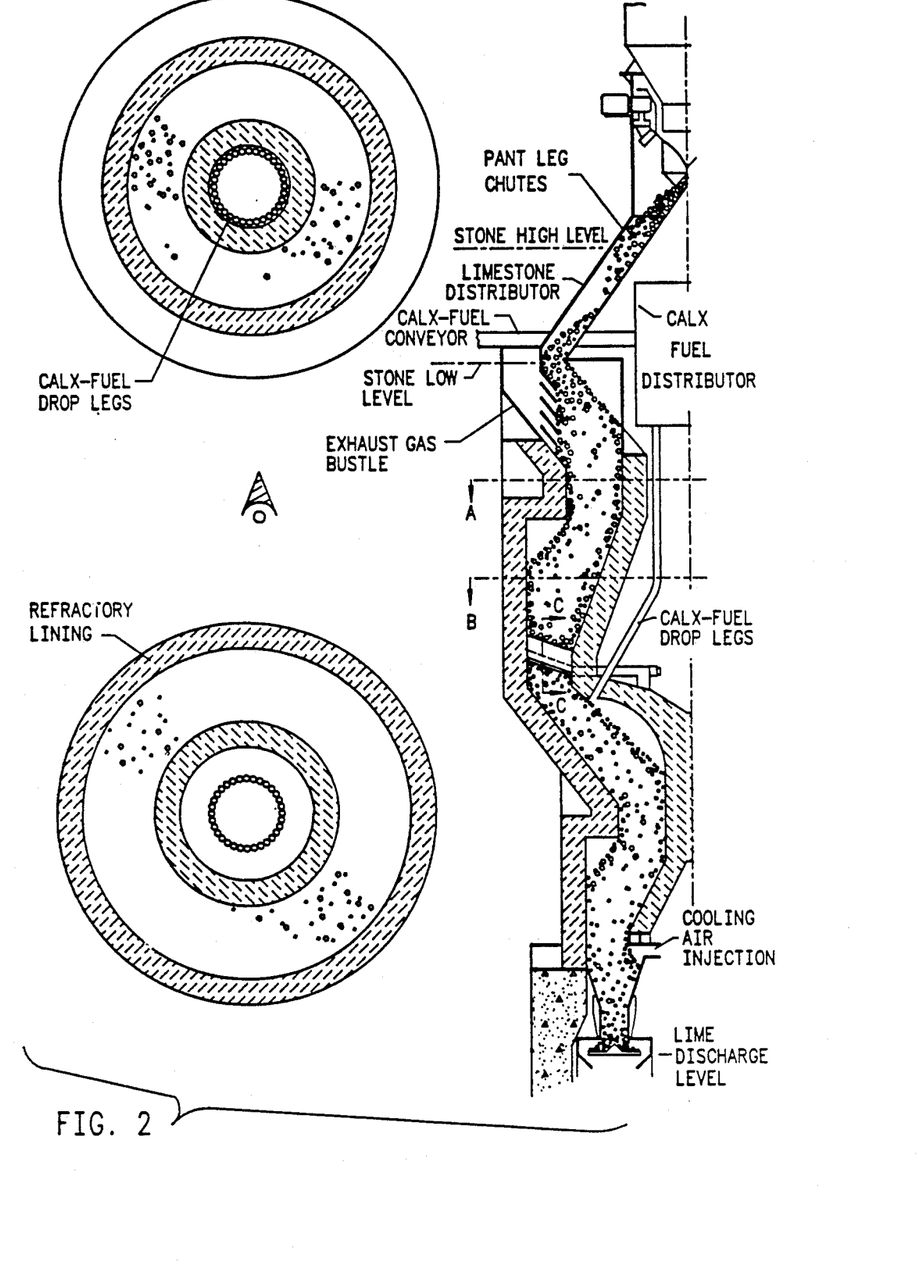
FIG. 2 shows horizontal cross sections of the entire kiln, at Stations A and B. Section C—C shows a vertical cross section of the hooded bridge, according to the invention.

Referring to FIG. 2, a horizontal cross section of the entire typical kiln taken at Station A is shown in Section A—A. Likewise, a horizontal cross section of the entire kiln at Station B is shown in Section B—B, where Section B—B shows the peak area cross section. A vertical cross section taken at Plane C perpendicular to a radius of the kiln is shown in Section C—C, showing a fuel preheating method by diverting some of the gas flow around the drop legs and back into the main gas flow at the hooded bridges.

Referring to FIG. 2, the primary path of the fine fraction of the charge is shown in this vertical cross section of the left half of a typical annular, cascading, vertical shaft kiln as well as the primary path of the coarse fraction. These paths are the result of the law of falling particulate matter of varying sizes when applied to the cascading process path. According to this rule, the larger particles tend to fall to the outside of the pile or path. Consequently, the fine fraction tends to take the shortest route from the exhaust bustle to the lime discharge level while the coarse fraction tends to take a path that as nearly as long as possible. This allows the larger particles a longer travel time and thus a longer process time.

As with the charge, the path of the coarse fuel particles tends to be more along the outside of the curve of the process path, while the fine fraction of fuel tends to travel the shortest route to the lime discharge level.

The region in the process path occupied by the fines fraction of the charge has a higher number of particles and therefore a greater resistance to opposing gas flow. Therefore, the gas encounters lower flow resistance when travelling against the flow of the coarse fraction of the charge. However, since the cascading path forces the fines fraction and the coarse fraction to cross several times during the traverse of the process path, the least resistance gas path also must cross the fines fraction that same number of times. This assures that the fines fraction will be sufficiently exposed to the gas path to achieve the desired quality of end product.

Not only is the temperature profile of this invention flatter and without sudden peaks, but it also provides a solids temperature much closer to the gas temperature.

Figure 3:
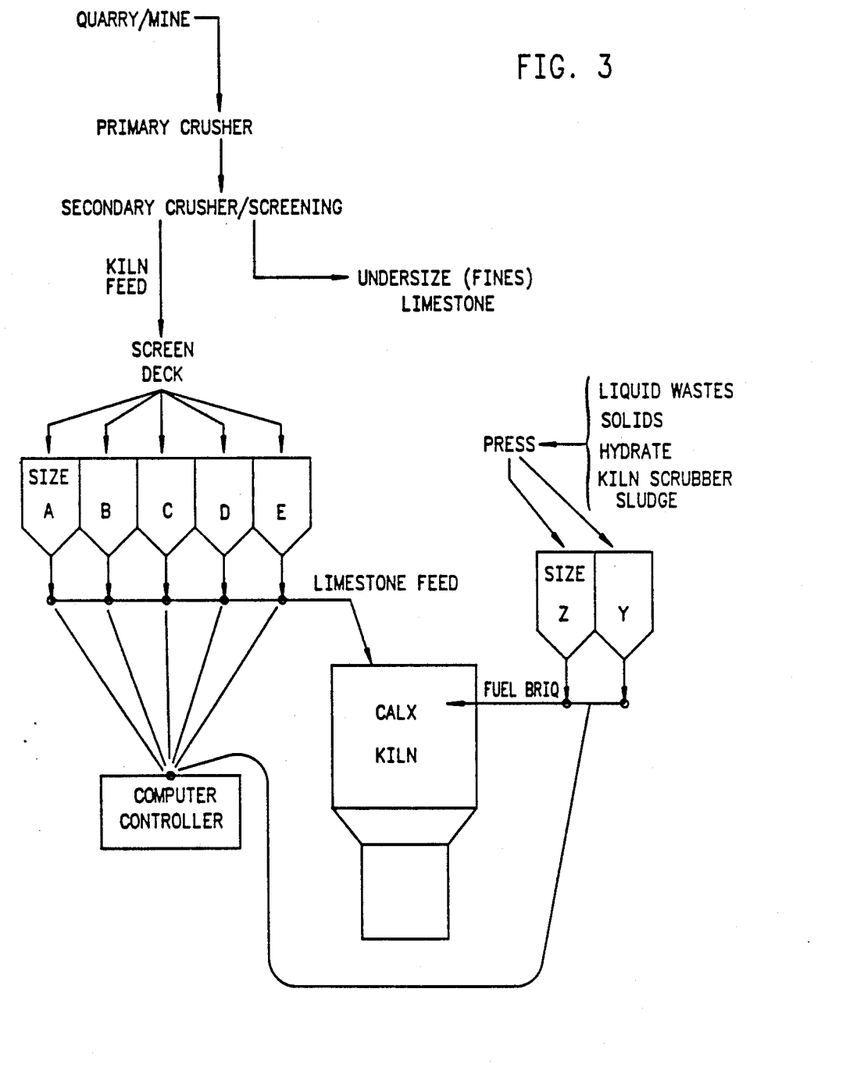
FIG. 3 is a schematic representation of computerizing the lime manufacturing process, according to the invention.

FIG. 3 shows a schematic representation of computerizing the lime manufacturing process wherein a computer receives information about the conditions in the kiln. The computer is programmed with the specific geometry of the kiln and receives data about the physical condition of the kiln and the availability of various sizes of limestone and fuel briquettes and by iteratively solving process equations repeatedly, determines the best limestone size and fuel briquette size and gas flow rate for optimum quantity and quality of product for the minimum input energy requirements.

There are two reasons why the size range of kiln-feed needs to be so limited. first, with all the various sized pieces of stone mixed together, the smaller rocks act to fill the void spaces between the larger rocks thus resulting in restricting the air flow through the bed of the kiln-feed. The second reason is that the time required to completely calcine a piece of limestone to lime is strongly dependent on the size of the individual piece of limestone. For reasons of product quality it requires that all of the product must be treated in roughly the same time period, otherwise some of the lime will have been calcined at too high a temperature while other pieces of the product remain largely limestone and are far short of being converted to lime.

With the kiln-feed as a single mix of the whole size range there is constant variation in the size distribution within the range resulting from the stockpile being built-up and drawn down. This fluctuation of size distribution within the given size range results in uneven calcination conditions within the kiln system. Since a piece of limestone 3″ in diameter takes nearly 9 times as long to completely calcine as a piece 1″ in diameter, at the same temperature, the kiln operator is attempting to respond to variations in the kiln due to the changing thermodynamic load of the kiln-feed.

More importantly the rate of calcination, hence the heat flux density requirement, changes dramatically over the period of calcination. At a given temperature the rate of calcination starts out as a maximum and continually decreases until the rate asymptotically approaches zero. Thus a seemingly subtle shift in size distribution in a 1″ to 3″ kiln-feed has a profound effect on the heat demand in a kiln. Consequently, a kiln operator is not so much controlling a kiln as he is simply trying to prevent it from getting totally outside a range that makes acceptable product. With limestone drawn from a pile of a single size range, the size distribution is constantly changing and when the distribution is not measured the operator is never able to know in advance what is coming to the kiln. Consequently, the operator is always chasing after what has happened rather than being able to predict what will happen. In the process of reacting to events rather than controlling events the operator invariably overreacts or underreacts, making fuel minimization a virtual impossibility.

The control of limestone size distribution in a kiln is fundamental to a uniform high quality product made with a minimum of fuel.

All lime kilns are required by Federal EPA regulations to have some type of control device for both particulate as well $SO_2$ control, for shaft kilns the specified control device is a wet scrubber. By having a scrubber as a control device it is then possible to utilize materials which have signficant chlorine and fluorine concentrations including waste oils with PCB's. The hydrocarbons are destroyed in the combustion process with by-products of Chlorine and fluorine gas, $Cl_2$ and $F<_2$, or HCl and HF. Both gases are readily absorbed in water. In turn the halides can be removed from the scrubber liquor by raising the pH through the addition of calcium hyroxide, hydrate, and precipitating the $CaCl_2$ and $CaF_2$.

The concept of co-generation, of combining the functions of incineration and power generation are far more costly to install than the combined functions of incineration and lime production in the invention. On an equal revenue basis the use of the heat to produce electricity requires 5 times the energy flux through 3 times the value in capital equipment to gross the same income. The competition for making low cost electricity is very sharp where as the situation in the lime industry is that the existing plants are on the average rather old and the efficiency mediocre at best. Thus the competitive margins for the co-production of lime with incineration are much more attractive than for electricity.

Briquettes of certain select waste materials can be processed to a limited extent in existing kilns. Thus the lime companies would be able to reduce their fuel costs and obtain a modest increase in revenue with their existing equipment. The invention can process waste streams not possible with existing equipment and can process acceptable waste streams more economically than now possible, thus expanding their market share and revenues.

In order to overcome the above drawbacks, the present invention has as objects providing two distinct elements in the overall concept of a vertical or shaft kiln which can efficiently utilize fuels having a significant volatile content. The first part is the design of the kiln itself, its feed and control systems and its thermal efficiency; the second part is the design of the fuel and charge materials and how they are introduced into the kiln.

According to another feature of the invention, an adjunct of the fuel design is that low grade (low BTU content) materials may be used as fuels. Hazardous materials may be used as fuels, and in the course of being used as a fuel the hazardous materials are effectively destroyed.

According to another feature of the invention, rather than a single size range of limestone being used as the kiln feed-stock the invention uses a series of bins and a computer controller so that several narrow size ranges of limestone can be utilized.

For example, instead of using a size range of 1"×3" in a single mix as kiln-feed one could use ⅜"×5" as a size range but in sub-sizes of ⅜"×1"; 1"×2"; 2"×3"; 3"×4"; and 4"×5", where the sub-sizes are sent to the kiln sequentially rather than as one single mix. In this example the plant has a quarry to kiln-feed yield of 62% with the single 1"×3" size range of kiln-feed; the same limestone would crush down to a ⅜"×5" kiln-feed size with a quarry yield of 84%. For every unit of 100 thousand tons of annual production (of lime) this nets a savings of 84,000 tons of limestone that need not be quarried; the quarry demand is reduced from 319 thousand to 235 thousand tons. One could accomplish this with five stockpiles, one each for the sub-sizes of the kiln-feed: an expensive approach that requires considerable land area. A far simpler method is with a screen deck and five surge bins each having the capacity of only a few hours' kiln feed along with (most importantly) a computer that has a sufficiently sophisticated software program to dynamically monitor and decide how to sequence the feed from the five bins and operate the kiln accordingly.

Having the kiln-feed in a few very narrow size ranges rather than one broad mix has two important advantages: while the narrow sub-range does not feed uniform, identical spheres of limestone, the pieces are in fact much closer to being uniform in size and therefore calcination behavior is much more consistent within a sub-range. Most importantly, in this system the sub-ranges are fed according to a known pattern which in turn means that the heat load in a kiln is predictable and firing conditions can be tailored to suit the required thermodynamic load.

Secondly, the air flow resistance through a bed of rocks, or any solids, is a minimum for uniform spheres. Splitting the kiln-feed into sub-ranges such that all of the rocks are all roughly the same size does allow a maximum void space or porosity in the bed. A given collection of rocks has a greater porosity and lower air flow resistance if divided into narrow size ranges and then layered, than the identical rocks have if they are all mixed together. In the earlier example, a particular kiln-feed in the size range of 1"×3" has almost 20% more resistance than the same limestone has if split into 4 sub-ranges; moreover, the same limestone in a total range of ⅜"×5" but split into 5 sub-ranges and layered has the same air flow resistance as the 1"×3" size range in a single mix. Thus the same kiln system could utilize a much wider overall size range if the limestone is fed in narrow sub-ranges.

While the control of size distribution is essential to the smooth, efficient operation of the said kiln, other existing kiln systems could benefit significantly by installing the multiple feed size system described above. Preheater kilns are subject to a recirculating dust load which creates operational difficulties and helps to transfer the coal ash impurities to the lime product; the extent of the dust recycle depends primarily on the bed porosity in the preheater and the kiln gas temperature as it enters the preheater, assuming the limestone and coal are not variables. The system of having the kiln-feed split into narrow sub-ranges then also minimizes the dust capture capacity of the preheater and thus the dust recycle.

The invention is unique is three respects: (1) the cross-sectional area of the kiln changes to maintain an optimal gas velocity of the kiln gases with respect to the limestone/lime pieces as they're being calcined; (2) the control of the size distribution of the limestone being fed to the kiln makes it possible to predict and control the heat flux density that is required for the calcination that given size fraction and distribution of limestone; (3) the use of a briquetted fuel which is introduced into the kiln at an intermediate point makes it possible to achieve high burn-out levels of the combustibles in the fuel and yet maintain bulk gas temperatures which are close to the minimum necessary to make calcination proceed at a practical rate.

The result is that the total, overall size range of material utilized from the quarry is wider, hence the yield to lime is increased. But at any given time the size range of material in the kiln is narrower that with the conventional single size range.

According to another feature of the invention, computer control of the limestone feed to a kiln makes it possible to expand the size range of kiln-feed and yet maintain and/or more likely improve, product quality. The economy of operation obtained from being able to utilize a wider size range there-by realizing a higher quarry to product yield gives the system a substantial return on investment.

According to another feature of the invention, the fuel briquettes are themselves an important chemical process and set of reactions. Being able to incorporate waste materials, hazardous or not, that have some calorific value is an important feature.

A very wide spectrum of materials can be considered as potential fuels. The list of materials that can be made into a briquette which is in turn acceptable includes but is not limited to: coal, coal fines refuse from coal washing plants, petroleum coke, coke breeze from blast furnaces, and numerous waste streams. As of June 1985 it is no longer possible to dispose of liquid wastes by placing them in drums or other containers and placing the container in a secured land-fill. The new RCRA rules mandate that the waste material be stabilized prior to inplacement in the land-fill. Many of the materials being disposed of contain some combustible materials in a water medium, e.g. many paint and solvent waste liquids. These waste liquids have very little heating value but are costly to stabilize. The current disposal method under the new rules is to mix the waste liquids with dust from lime and/or cement kilns to form a stabilized mass. If those same waste liquids are combined with other materials of a higher calorific content and pressed into briquettes with hydrate as the matrix then the briquette can be used as kiln fuel.

According to another feature of the invention, Waste streams and sludges containing metals can also be used as fuels. By controlling the fuel density in the kiln, the temperature profile as well as heat flux density, the fuel briquette has a unique combustion behavior. Combustion of the fuel briquette occurs as a glowing ember rather than as a flaming lump. In this controlled process the reactions are that the hydrate matrix is dissociated to calcia, lime (CaO), followed by a fluxing melt of compounds such as $CaF_2$ into CaO and $2CaO.SiO_2$. Metals in the sludges are oxidized and combined into the fluxed complexes of CaO and MgO. Even metals such as $Cr^{+6}$ which were in solution in the waste material disproportionate at elevated temperatures into its $+3$ or $+5$ valence and are combined into ceramic complexes.

Incineration of low BTU liquids containing metals such as hexavalent chrome are difficult to accomplish within the strict emission limits set by the EPA. The time that the metal stays in the incinerator is essentially the transport time of the flue gas, a few seconds. Moreover, there is little if any substrate present with which to react the metal. By contrast, with the incorporation of the metal bearing liquids into these fuel briquettes. Additionally, another feature of this invention provides hours of retention in the kiln at temperatures well below flame temperatures. This assures that the metals are combined as oxide complexes with Calcium and Magnesium. Ceramicists use metal oxides such as chrome to make color glazes for plates, cups, etc. The incorporation of the metal as an oxide into a ceramic complex renders it virtually harmless.

An additional feature of the invention is that under controlled combustion conditions most of the sulfur of the fuel is retained as $CaSO_4$ in the calcia matrix.

The invention has a significant advantage in that the hot filter bed of lime/limestone provides thermal inertia and an ignition source for the hydrocarbons as they are volatilized and given off. The heat recovery is in the lime that is produced for commercial sale.

According to another feature of the invention, the invention involves the reactions of CaO at elevated temperatures, which technology is a substantial improvement over the state of the art.

A lime kiln can be designed which is both efficient and can accept a variety of hazardous materials as partial or total fuel supply. The lime which is produced can be used in treating wastes and fixing liquid wastes prior to incineration. A portion of the lime produced with the combustion of hazardous wastes can be used in steel melt shops and for flue-gas-desulfurization. The need to have a cost effective method of incineration of hazardous wastes provides the market opportunity necessary to spur a re-building and re-organization of the U.S. lime industry. Incineration of hazardous wastes in a lime kiln creates a dual revenue source or co-generation: incineration of the wastes is itself a service industry; and manufacturing lime yields a marketable commodity. Other designers have provided kilns for incineration in which the heat is used to make steam and in turn electricity. Co-generation with electricity requires more than twice the capital investment, and three times the processing volume of hazardous wastes to yield the same revenue as the invention which incinerates wastes and produces lime.

It will thus be seen that the present invention does indeed provide an improved apparatus, system and process for calcination and which is superior in operability, reliabiity, economy and efficiency, as compared to such prior art systems.

As the limestone enters the invention there is a profile of gas temperature, and gas velocity which provides the optimum heat transfer rate to the incoming limestone of a particular size range and distribution. If the gas velocity is too high then the kiln gases fail to transfer the enthalpy of the gas to the limestone, if the velocity is too low then the kiln is larger (and more expensive) than necessary.

The heat flux density from the combustion of the fuel is a function of the fuel materials, the size of the fuel particles, the temperature environment into which the particles are injected, and the volume percent of fuel present up to the limit of the oxygen available. Smaller particles of fuel expose more of the mass of the fuel to the air stream, hence have a higher rate of combustion for a given oxygen content of the air stream. Another feature of the invention is that it uses briquettes as a fuel source, the briquettes are composed of hydrate (calcium hydroxide), and combustible material such as coal, coal fines refuse, petroleum coke fines, and hazardous wastes. Briquettes are produced in a variety of sizes for the invention for the purpose of being able to control the heat flux density in the kiln as the fuel is burned out.

Another feature of the invention is the use of a computer. The transport time of the charge (limestone/lime) through the kiln is controlled in conjunction with the fuel briquette density (the ratio of briquettes to limestone), and the size of the briquette used (relative to the size of limestone being calcined). For any given size limestone being fed to the kiln there is an optimum amount and size of briquette which will simultaneously provide the maximum possible lime production rate using the least possible amount of fuel. The solution involves the simultaneous solution of equations for the heat transfer to the limestone for calcination, the temperature profile to be created by the heat flux density that is a consequence of the fuel briquette density, temperature at injection and gas flow rate. Because the solution requires numerous iterations of the equations to arrive at an optimal fuel size and amount, and the solutions must be done in real time as the kiln is in operation the only controller capable of such a prodigous mathematical burden is a computer. The heat and mass transfer equations may be done on a finite volume basis.

Another feature of the invention is a pressed briquette comprised of the proper size distribution of materials, and simultaneously having the desired chemical composition, results in a product that satisfies the steel producer and is readily manufactured in a lime plant.

It is conventional in steel making that compositions in the $CaO-CaFe_2O_4-CaAl_2O_4$ system are more readily dissolved in steel making processes than CaO. Development of the terinary oxide system occurs in a two phases (solid and liquid) during calcination of the limestone to lime. The extent of the reaction is a function of the time-temperature history to which the materials were exposed, the size distribution of the limestone/lime particles, and the number of contact points between particles. For the same time-temperature history the briquette with the highest number of contact points between particles will have the most extensive development of the oxide complex.

Contact points in the briquette are achieved by the pressure used during the initial forming of the briquette, a minimum of 1000 psi should be used and 5000 psi is preferred; and the size distribution of the constituent materials. A mix of equal portions of coarse and fine particles, with about 10 to 20% of medium size particles results in the maximum as-pressed density and number of contact points. Fine particles are taken to be less than 10% of the size of the coarse particles. Pressures above 20,000 psi do not appreciably increase the density or number of contact points in the briquette, its strength after firing, or the extent of complex oxide development. All other combinations of size distribution yield lower pressed densities and fewer contact points (H. F. Norton, Elements of Ceramics, 1955), resulting in less development of the oxides and lower strength of the fired briquette.

Lime pebbles have crushing strengths in the range of 100 psi (unconfined compression test). These briquettes have crushing strengths in the range of 1000 psi (unconfined compression test).

They can be produced in a range of chemical compositions to suit the individual steel producer and their melt shop practice. Ideally, they utilize waste iron from the mill (in any finely divided form such as mill scale, scarfing fines, iron ore, etc.,), dolomite or dolo-lime as a source of MgO, limestone fines and bauxite: the resultant composition of 80% CaO, 10% MgO, 7% $Al_2O_3$, and 3% $Fe_2O_3$, can be modified to the needs of the individual melt shop. Limits of the compositional range are 0 to 50% MgO; 0 to 20% $Al_2O_3$; 0 to 10% $Fe_2O_3$; with the balance as CaO.

Complex spinels are formed during processing as iron difuses into the calcium and magnesium oxide particles and the calcium and magnesium ions back difuse into the iron particle. This process promotes a sintering reaction which further densifies the fired briquettes and adds to its strength. The process is similar to the reactions that give direct-bonded basic refractories their strength. However, the spinels which give the briquettes its properties do not require chrome (the basis for the spinel formation in direct-bonded refractories). These briquettes are designed to fuse in a metal bath whereas the direct-bonded refractories are designed to retain their strength at the same temperatures and to resist attack by the metal bath.

The invention consists of an upright, vertical anular shaft, having variable inside and outside diameters, thus variable cross-sectional area.

The variable inside and outside diameters of the invention cause the limestone/lime charge in the kiln to descend at slightly different rates. Because any charge of limestone necessarily consists of a mixture of particle sizes, it is desired that the larger pieces should be heated longer in order to attain the same degree or extent of calcination (conversion to CaO) as the smaller particles. This is accomplished in the invention in that the natural cascading path of the larger particles is longer than the path of the smaller particles within any given charge of limestone. There is then a differential in the transport rate through the invention, the larger particles spending slightly more time being processed than the smaller particles.

It is desired but not essential to split the overall limestone feed to the invention into a few, narrower size splits. Ideally, the 1.5 power of the size ratio within any given split is the differential transport rate of the largest to the smallest particles. That is, if the size ratio within any given size is 1.2:1, the differential transport time should be 1.4:1. Since the kiln design is fixed, the particle size limits of any size split should be selected to suit the kiln dimensions.

The variable cross-sectional area allows the solids bulk charge movement (downward) and the gas flow (upward), to have different bulk velocities at various points in the process. The invention cross-sectional area varies such that the relative gas to solids velocity is almost a constant over most of the process. The variable cross-sectional area compensates for the fact that the mass of kiln gas increases in the upper part of the kiln, as well as the fact that there are temperature changes in the process.

Use of the briquettes in which combustion takes place as a glowing coal rather than a flame allows the process heat release rate to be distributed in the same manner as the calcination conversion occurs. Early in the calcination process the mass rate of conversion of $CaCO=3$ to CaO is slow, it gradually increases to a maximum rate and then diminishes. The variable cross-sectional area of the invention in combination of the combustion mechanism of a glowing coal (for particles larger than 200 microns the rate limiting step in combustion is mass transport at the particle surface) provides an energy density in proportion to the calcination process demands. The invention cross-sectional area variation thus makes it possible to match the energy release density of the fuel combustion process to the process demands of calcination. Without the cross-sectional variation in an anular ring configuration the process is always mismatched, that is, the maximum fuel combustion rate does not coincide with the maximum calcination conversion rate.

The variable inside and outside diameters of the invention cause the relative locations of the smaller and larger particles within the charge to move. That is, initially the smaller particles within any given part of the charge start on the outside diameter of the anular space, with the larger particles on the inside diameter. Lower down in the invention the diameters change, which by the natural cascade of the material causes the larger particles to move to the outside diameter, with the smaller particles moving straight downward (the natural flowpath). The relative movement of the large and small particles within the given size charge from inside to outside diameter of the anular space occurs three times. The lowest resistance path for the kiln gases is through the volume where the particles are the largest. Because of the reversal of the position of the larger and smaller particles from inside to outside diameters it is necessary for the gas to pass through the region of smaller particles in order to reach the low resistance path of the larger particles. This ensures that the kiln gases will have passed evenly dispersed through the regions of smaller particles as well as those of the larger particles. Without the variable diameter of the invention the preferential path of the kiln gases is through the regions occuppied by the larger particles. This differential gas flow (termed channelling) results in differntial processing (extent of calcination) between larger and smaller particles in other shaft kilns. There is a direct electrical analogy in gas flow in that the electrical current through several parallel circuits is inversely proportional to the resistance in each circuit. In gas flow the mass flow rate is inversely related to the porosity and particle size in any region of a semi-static bed.

There is a free surface of limestone/lime at an intermediate point in the invention, roughly mid-way in the vertical direction. This allows solid fuel to be introduced in lump form and evenly distributed over the surface of the limestone/lime charge. The intermediate fuel entry location also makes it possible to ensure that the volatile fraction of the fuel is combusted, and that the full heating value of the fuel is realized in the calcination process. Design of the solid fuel in lump form, a pressed briquette of any of a variety of combustible materials, makes it possible to control the temperature profile in the invention. Both the peak temperature, temperature distribution can be controlled by matching the size, and composition of the briquettes to the size distribution of the limestone/lime charge being calcined.

It is also possible to control the invention so as to have a proscribed time-temperature profile for the kiln gases rather than the limestone/lime charge. This is desired and in some instances essential, when hazardous waste materials have been incorporated in the briquettes. A wide, almost unlimited range of combustible materials, including chemical and biological hazardous substances can be incorporated in the briquettes. Because the combustion occurs in the briquettes as a glowing ember with the volatile portion being out-gased, the rate limiting step of combustion is the mass transfer of air to the vicinity of the fuel. The peak temperature is determined by the fuel density, thus the time-temperature profile of the gases can be set arbitrarily by the amount of fuel added and the rate at which air is introduced. The invention can be operated so that the solids movement is very slow, thus allowing for a much reduced air velocity. This has the effect of giving the kiln gases a longer residence time in the kiln; typically, the gas residence time in most kilns is on the order of a few seconds, 4 to 8 seconds. In the invention the gases can be retained during slow speed operation up to several minutes, and exposed to peak temperatures of 2800 F. This feature is essential to the economical destruction of hazardous materials.

The size distribution reversal from inside to outside diameter, makes it possible to utilize any manner of materials of marginal heating value as part of the briquette. If the material bed did not reverse itself, it would be impossible to ensure that low concentration levels of combustibles of high molecular weight would be totally burned out. Sludges, from painting operations, chemical processing, as well as biological wastes are often in this catagory. Typical incinerators maintain a support flame of natural gas or oil to ensure a high temperature environment for the total destruction of low concentrations of hazardous materials, unnecessary in the invention burning briquettes.

The control of the time-temperature profile of the solids charge in the invention make it ideally suited to process briquettes, a pre-fused, calcium oxide based product for use in steel making slags. The fuel is a pressed briquette of lime, limestone, hydrate, an alumina source (most economically bauxite), and an iron source. In the invention the control of time-temperature alllows the briquette to sinter fully, developing the desired strength and designed $CaO'AL_2O_3{}^1MgO'FeO_3$ complexes. Temperatures which approach the melting point of the quaternary oxide mix tend to make the briquettes sticky, and casue the melted micro-structure of the briquette to have a low specific surface area. The melted micro-structure tends to slow down the slag formation in the steel making process (an undesired property of the pre-fused material).

Although the present invention has been described in conjunction with preferred embodiments, it is to be understood that modifications and variations may be utilized without departing from the principles and scope of the invention as defined by the following claims.

What is claimed and desired to be secured by Letters Patent, is:

1. A multi-incline annular shaft kiln comprising:
   (a) a generally vertical shaft kiln having an annular flow path therethrough, said flow path being defined by an annular inner wall and an annular outer wall to accommodate the continuous downward movement of a particulate solids charge, and the countercurrent or co-current flow of gas;
   (b) opening means for receiving the solid particulate charge, disposed at an uppermost portion of the kiln;
   (c) exhaust means for exhausting said gas from said flow path;
   (d) gas inlet means for allowing gas to enter said kiln;
   (e) solid product outlet means for discharging solid material from a lower portion of the kiln; and
   (f) means for causing larger and smaller particles of said charge to reverse radial position along said flow path, said means including,
   an inner wall having at least one section sloping radially outwardly in the downward direction;
   an outer wall having at least one section sloping radially inwardly in the downward direction;
   said inner and outer walls having a total of at least three of said sections; and
   said sloping inner and outer wall sections alternating along said flow path.

2. The kiln according to claim 1 further comprising fuel delivery means for allowing solid particulate fuel to enter said kiln along said flow path.

3. The kiln according to claim 2 wherein said solid fuel is fed to the surface of the particulate charge after the particulate charge has progressed along said flow path past a first inner wall sloping section, past a first outer wall sloping section and past a second inner wall sloping section.

4. A multi-incline annular shaft kiln comprising:
   (a) a generally vertical shaft kiln having an annular flow path therethrough, said flow path being defined by an annular inner wall and an annular outer wall to accommodate the continuous downward movement of a particulate solids charge, and the countercurrent flow of gas;
   (b) an upper inlet for receiving particulate feed;
   (c) an upper gas exhaust outlet;
   (d) a lower gas inlet;
   (e) a lower solids outlet; and
   (f) means for causing larger and smaller particles of said charge to reverse radial position along said flow path, said means including an inner wall having two sections sloping radially outwardly in the downward direction and an outer wall having one section sloping radially inwardly in the downward direction, said outer wall sloping section being positioned along said flow path between said two inner walls sloping sections.

* * * * *